(12) United States Patent
Rached et al.

(10) Patent No.: US 9,512,343 B2
(45) Date of Patent: Dec. 6, 2016

(54) COMPOSITION BASED ON 2,3,3,3-TETRAFLUOROPROPENE

(75) Inventors: Wissam Rached, Chaponost (FR); Beatrice Boussand, Saint Foy les Lyon (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 13/232,165

(22) Filed: Sep. 14, 2011

(65) Prior Publication Data

US 2012/0068105 A1  Mar. 22, 2012

(30) Foreign Application Priority Data

Sep. 20, 2010 (FR) .................................... 10 57482

(51) Int. Cl.
*C09K 5/04* (2006.01)
*C10M 171/00* (2006.01)

(52) U.S. Cl.
CPC .......... *C09K 5/045* (2013.01); *C10M 171/008* (2013.01); *C09K 2205/126* (2013.01); *C09K 2205/22* (2013.01); *C10M 2207/2835* (2013.01); *C10M 2207/2895* (2013.01); *C10M 2209/043* (2013.01); *C10N 2220/302* (2013.01); *C10N 2240/30* (2013.01)

(58) Field of Classification Search
CPC ............ C09K 5/045; C09K 2205/126; C09K 2205/22; C10M 2207/2835
See application file for complete search history.

(56) References Cited

U.S. PATENT DOCUMENTS

| | | |
|---|---|---|
| 8,070,977 B2 | 12/2011 | Rached |
| 8,075,798 B2 | 12/2011 | Rached |
| 8,246,850 B2 | 8/2012 | Rached |
| 8,252,198 B2 | 8/2012 | Rached |
| 8,557,135 B2 | 10/2013 | Rached |
| 8,808,569 B2 | 8/2014 | Rached |
| 8,858,824 B2 | 10/2014 | Boussand |
| 8,858,825 B2 | 10/2014 | Guerin et al. |
| 8,951,432 B2 | 2/2015 | Boutier et al. |
| 9,005,468 B2 | 4/2015 | Rached |
| 9,011,711 B2 | 4/2015 | Rached |
| 9,028,706 B2 | 5/2015 | Rached et al. |
| 9,039,922 B2 | 5/2015 | Rached |
| 9,127,191 B2 | 9/2015 | Rached |
| 9,133,379 B2 | 9/2015 | Rached |
| 9,175,203 B2 | 11/2015 | Rached |
| 9,267,064 B2 | 2/2016 | Rached |
| 9,399,726 B2 | 7/2016 | Rached |
| 2006/0243944 A1 | 11/2006 | Minor et al. |
| 2008/0230738 A1* | 9/2008 | Minor et al. .................. 252/67 |
| 2010/0038583 A1* | 2/2010 | Shimomura et al. ........... 252/68 |
| 2011/0084228 A1 | 4/2011 | Rached |
| 2011/0095224 A1 | 4/2011 | Rached |
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0068104 A1 | 3/2012 | Rached et al. |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2013/0055733 A1 | 3/2013 | Rached |
| 2013/0055739 A1 | 3/2013 | Rached |
| 2013/0061613 A1 | 3/2013 | Rached |
| 2013/0092869 A1 | 4/2013 | Boussand |
| 2013/0105724 A1 | 5/2013 | Boussand |
| 2013/0186114 A1 | 7/2013 | Guerin et al. |
| 2013/0299733 A1 | 11/2013 | Boussand |
| 2014/0008565 A1 | 1/2014 | Rached et al. |
| 2014/0075969 A1 | 3/2014 | Guerin et al. |
| 2014/0110623 A1 | 4/2014 | Boutier et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0184051 A1 | 7/2015 | Rached |
| 2015/0322317 A1 | 11/2015 | Collier et al. |

(Continued)

FOREIGN PATENT DOCUMENTS

| | | |
|---|---|---|
| JP | 4-110388 | 4/1992 |
| WO | WO 2004/037913 | 5/2004 |
| WO | WO 2008/105256 A1 | 9/2008 |

OTHER PUBLICATIONS

U.S. Appl. No. 14/651,855, Collier, et al.
U.S. Appl. No. 14/651,925, Deur-Bert, et al.
U.S. Appl. No. 14/655,500, Deur-Bert, et al.
U.S. Appl. No. 14/823,430, Rached.
U.S. Appl. No. 14/830,130, Rached.
U.S. Appl. No. 14/772,950, Bonnet, et al.
U.S. Appl. No. 14/773,961, Bonnet, et al.
U.S. Appl. No. 14/873,855, Rached.
U.S. Appl. No. 14/873,891, Rached.
U.S. Appl. No. 14/880,605, Boussand.
French Search Report issued in FR 2964975 (Appln No. 1057482), May 16, 2011, République Française, INPI, France, 2 pages.

(Continued)

*Primary Examiner* — John Hardee
(74) *Attorney, Agent, or Firm* — Buchanan Ingersoll & Rooney P.C.

(57) ABSTRACT

The subject of the present application is a composition comprising a lubricant based on polyol esters (POEs) or PVE and a refrigerant F comprising from 1 to 99% by weight of 2,3,3,3-tetrafluoropropene (HFO-1234A and from 1 to 99% by weight of trans-1,3,3,3-tetrafluoropropene (trans-HFO-1234ze). The subject of the present application is also the use of said composition in refrigeration, air conditioning and heat pumps.

4 Claims, No Drawings

(56) References Cited

U.S. PATENT DOCUMENTS

| | | | |
|---|---|---|---|
| 2015/0322321 | A1 | 11/2015 | Deur-Bert et al. |
| 2015/0344761 | A1 | 12/2015 | Rached |
| 2015/0353799 | A1 | 12/2015 | Deur-Bert et al. |
| 2015/0353802 | A1 | 12/2015 | Rached |
| 2016/0009555 | A1 | 1/2016 | Bonnet et al. |
| 2016/0024363 | A1 | 1/2016 | Rached |
| 2016/0025394 | A1 | 1/2016 | Rached |
| 2016/0031773 | A1 | 2/2016 | Bonnet et al. |
| 2016/0032165 | A1 | 2/2016 | Boussand |
| 2016/0194541 | A1 | 7/2016 | Guerin et al. |
| 2016/0244652 | A1 | 8/2016 | Rached |

OTHER PUBLICATIONS

Collier, Bertrand, et al., U.S. Appl. No. 14/651,855 entitled "Composition Including 2,3,3,3-Tetrafluoropropene," filed in the U.S. Patent and Trademark Office on Jun. 12, 2015.
Deur-Bert, Dominique, et al., U.S. Appl. No. 14/651,925 entitled "Composition Containing 2,3,3,3-Tetrafluoropropene and 1,2-Difluoroethylene," filed in the U.S. Patent and Trademark Office on Jun. 12, 2015.
Deur-Bert, Dominique, et al., U.S. Appl. No. 14/655,500 entitled "Azeotropic or Quasi-Azeotropic Composition of Chloromethane," filed in the U.S. Patent and Trademark Office on Jun. 25, 2015.
Rached, Wissam, U.S. Appl. No. 14/823,430 entitled "Use of Ternary Compositions," filed in the U.S. Patent and Trademark Office on Aug. 11, 2015.
Rached, Wissam, U.S. Appl. No. 14/830,130 entitled "Binary Refrigerating Fluid," filed in the U.S. Patent and Trademark Office on Aug. 19, 2015.
Bonnet, Phillippe, et al., U.S. Appl. No. 14/772,950 entitled "Composition Comprising HF and 2,3,3,3-Tetrafluoropropene," filed in the U.S. Patent and Trademark Office on Sep. 4, 2015.
Bonnet, Phillippe, et al., U.S. Appl. No. 14/773,961 entitled "Composition Comprising HF and 1,3,3,3-Tetrafluoropropene," filed in the U.S. Patent and Trademark Office Sep. 9, 2015.
Rached, Wissam, U.S. Appl. No. 14/873,855 entitled "Heat Transfer Fluid," filed in the U.S. Patent and Trademark Office on Oct. 2, 2015.
Rached, Wissam, U.S. Appl. No. 14/873,891 entitled "Ternary Compositions for Low-Capacity Refrigeration," filed in the U.S. Patent and Trademark Office on Oct. 2, 2015.
Boussand, Beatrice, U.S. Appl. No. 14/880,605 entitled "3,3,3-Trifluoropropene Composition," filed in the U.S. Patent and Trademark Office Oct. 12, 2015.
U.S. Appl. No. 14/903,461, Guerin, et al.
U.S. Appl. No. 14/990,159, Boussand, et al.
U.S. Appl. No. 14/992,387, Rached.
U.S. Appl. No. 15/070,955, Guerin et al.
U.S. Appl. No. 15/073,108, Rached, et al.
Guérin, Sophie, et al., U.S. Appl. No. 14/903,461, entitled, "2,3,3,3-Tetrafluoropropene Compositions Having Improved Miscibility," filed in the U.S. Patent and Trademark Office on Jan. 7, 2016.
Boussand, Beatrice, et al., U.S. Appl. No. 14/990,159, entitled "Stable 2,3,3,3-Tetrafluoropropene Composition," filed in the U.S. Patent and Trademark office on Jan. 7, 2016
Rached, Wissam, U.S. Appl. No. 14/992,387 entitled, "Ternary Compositions for High-Capacity Refrigeration," filed in the U.S. Patent and Trademark Office on Jan. 11, 2016.
Guerin, Sophie, et al., U.S. Appl. No. 15/070,955, entitled "Heat-Transfer Compositions Exhibiting Improved Miscibility with the Lubricating Oil," filed in the U.S. Patent and Trademark Office Mar. 15, 2016.
Rached, Wissam, et al., U.S. Appl. No. 15/073,108 entitled "Stabilization of 1-Chloro-3,3,3-Trifluoropropene," filed in the U.S. Patent and Trademark Office on Mar. 17, 2016.
U.S. Appl. No. 15/189,936, Rached.
U.S. Appl. No. 15/238,883, Rached.
Rached, Wissam, U.S. Appl. No. 15/189,936 entitled "Use of Ternary Compositions," filed in the U.S. Patent and Trademark Office on Jun. 22, 2016.
Rached, Wissam, U.S. Appl. No. 15/238,883 entitled "Heat Transfer Fluid Replacing R-134a," filed in the U.S. Patent and Trademark Office on Aug. 17, 2016.

* cited by examiner

COMPOSITION BASED ON 2,3,3,3-TETRAFLUOROPROPENE

The present application claims priority to French application Number FR 10.57482 filed Sep. 20, 2010.

BACKGROUND OF THE INVENTION

The present invention relates to a composition containing 2,3,3,3-tetrafluoropropene and trans-1,3,3,3-tetrafluoropropene and at least one lubricant, capable of being used in refrigeration, air-conditioning and heat pumps.

The problems presented by substances which deplete the atmospheric ozone layer were dealt with at Montreal, where the protocol was signed imposing a reduction in the production and use of chlorofluorocarbons (CFCs). This protocol has been the subject of amendments which have required the abandoning of CFCs and have extended the regulations to other products, including hydrochlorofluorocarbons (HCFCs).

The refrigeration and air-conditioning industry has invested a great deal in the replacement of these refrigerants and it is because of this that hydrofluorocarbons (HFCs) have been marketed.

In the motor vehicle industry, the air-conditioning systems of vehicles sold in many countries have been changed from a chlorofluorocarbon (CFC-12) refrigerant to a hydrofluorocarbon (1,1,1,2-tetrafluoroethane: HFC-134a) refrigerant, which is less harmful to the ozone layer. However, from the viewpoint of the objectives set by the Kyoto protocol, HFC-134a (GWP=1430) is considered to have a high heating power. The contribution of a refrigerant to the greenhouse effect is quantified by a criterion, the GWP (Global Warming Potential), which summarizes the heating power by taking a reference value of 1 for carbon dioxide.

Hydrofluoroolefins (HFOs) have a low heating power and thus meet the objectives set by the Kyoto protocol. Document JP 4-110388 discloses hydrofluoropropenes as heat-transfer agents.

In the industrial sector, the refrigerating machines most commonly used are based on cooling by evaporation of a liquid refrigerant. After vaporization, the refrigerant is compressed and then cooled in order to return to the liquid state and thus continue the cycle.

The refrigeration compressors used are of the reciprocating, scroll, centrifugal or screw type. In general, internal lubrication of the compressors is essential in order to reduce wear and heating of the moving members, complete their leaktightness and protect them against corrosion.

In addition to good heat-transfer agent properties, in order for a refrigerant to be commercially accepted, it must in particular exhibit thermal stability and compatibility with the lubricants. Specifically, it is highly desirable for the refrigerant to be compatible with the lubricant used in the compressor, present in the majority of refrigeration systems. This combination of refrigerant and lubricant is important for the implementation and the efficiency of the refrigeration system; in particular, the lubricant should be sufficiently soluble or miscible in the refrigerant over the entire operating temperature range. Thus, polyalkylene glycols (PAGs) have been developed as lubricants of HFC-134a in motor vehicle air conditioning.

Tests for miscibility of 1,1,3,3,3-pentafluoropropene and 1,3,3,3-tetrafluoropropene with lubricants have been described in Example 2 of document WO 2004/037913. Compatibility tests have also been described in Example 3, with polyalkylene glycol. However, these tests do not specify the nature of the 1,3,3,3-tetrafluoropropene isomer. Just recently, 2,3,3,3-tetrafluoropropene was chosen as a refrigerant for replacing HFC-134a in motor vehicle air conditioning.

The applicant has now developed a refrigerant and lubricant pairing which can be used in refrigeration, air conditioning and heat pumps.

DETAILED DESCRIPTION OF THE INVENTION

A subject of the present application is therefore a composition comprising at least one lubricant based on polyol esters (POEs) or on polyvinyl ether (PVE) and a refrigerant F comprising from 1 to 99% by weight of 2,3,3,3-tetrafluoropropene (HFO-1234yf) and from 1 to 99% by weight of trans-1,3,3,3-tetrafluoropropene (trans-HFO-1234ze). The refrigerant F may also comprise HFC-134a, and preferably at most 10% by weight.

Preferably, the composition according to the present invention comprises at least one lubricant based on polyol esters (POEs) or on polyvinyl ether (PVE) and a refrigerant F comprising from 5 to 70% by weight of 2,3,3,3-tetrafluoropropene (HFO-1234yf) and from 30 to 95% by weight of trans-1,3,3,3-tetrafluoropropene (trans-HFO-1234ze). The composition which is particularly preferred comprises at least one lubricant based on polyol esters (POEs) or on polyvinyl ether (PVE) and a refrigerant F comprising from 25 to 55% by weight of 2,3,3,3-tetrafluoropropene (HFO-1234yf) and from 45 to 75% by weight of trans-1,3,3,3-tetrafluoropropene (trans-HFO-1234ze).

The refrigerant F has the advantage, compared to HFO-1234yf alone, of having a low inflammability and a process for producing trans-HFO-1234ze which is less complex and less expensive than that for trans-HFO-1234yf. In addition, the refrigerant F, in combination with POE or PVE, exhibits good thermal stability. The refrigerant F may advantageously be used to produce heat at very high temperatures (around 100° C.) as a result of its high critical temperature.

Polyol esters are obtained by reaction of a polyol (an alcohol containing at least 2 hydroxyl groups —OH) with a monofunctional or plurifunctional carboxylic acid or with a mixture of monofunctional carboxylic acids. The water formed during this reaction is eliminated in order to prevent the reverse reaction (i.e. hydrolysis).

According to the present invention, the preferred polyols are those which have a neopentyl backbone, such as neopentyl glycol, trimethylolpropane, pentaerythritol and dipentaerythritol; pentaerythritol is the preferred polyol.

The carboxylic acids may contain from 2 to 15 carbon atoms, it being possible for the carbon backbone to be linear or branched. Mention may in particular be made of n-pentanoic acid, n-hexanoic acid, n-heptanoic acid, n-octanoic acid, 2-ethylhexanoic acid, 2,2-dimethylpentanoic acid, 3,5,5-trimethylhexanoic acid, adipic acid and succinic acid, and mixtures thereof.

Some alcohol functions are not esterified, however their proportion remains low. Thus, the POEs can comprise between 0 and 5 relative mol % of $CH_2$—OH units relative to the —$CH_2$—O—(C=O)— units.

The preferred POE lubricants are those which have a viscosity of from 1 to 1000 centiStokes (cSt) at 40° C., preferably from 10 to 200 cSt, and advantageously from 30 to 80 cSt.

The polyvinyl ether (PVE) oils are preferably copolymers of the following 2 units:

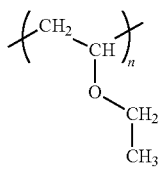
Unit 1

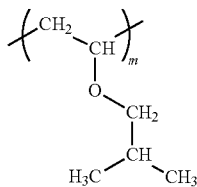
Unit 2

The properties of the oil (viscosity, solubility of the refrigerant and miscibility with the refrigerant in particular) can be adjusted by varying the m/n ratio and the sum m+n. The preferred PVE oils are those which have 50 to 95% by weight of units 1.

According to one preferred embodiment of the invention, the lubricant represents between 10 and 50%, inclusive, by weight of the composition.

The refrigerant F may also comprise additives such as odorous compounds.

A subject of the present invention is also the use of the abovementioned composition in:
- refrigeration, in particular domestic or commercial refrigeration, cold rooms, the food industry, the processing industry, refrigerated transport (trucks, boats);
- air conditioning: domestic, commercial or industrial air conditioning, where the appliances used are chillers or direct expansion appliances;
- heat pumps, in particular medium- and high-temperature heat pumps.

By virtue of their low glide temperature, the compositions according to the present invention can be used both in equipment with dry-expansion evaporators and in equipment with evaporators operating in a flooded system.

EXPERIMENTAL SECTION

The thermal stability trials are carried out according to standard ASHRAE 97-2007: "sealed glass tube method to test the chemical stability of materials for use within refrigerant systems".

The test conditions are as follows:
weight of refrigerant: 2.2 g
weight of lubricant: 5 g
temperature: 200° C.
duration: 14 days The lubricant is introduced into a 42.2 ml glass tube. The tube is then evacuated under vacuum and then the refrigerant F is added thereto. The tube is then welded in order to close it and placed in an oven at 200° C. for 14 days.

At the end of the test, various analyses are carried out:
the gas phase is recovered in order to be analysed by gas chromatography: the main impurities were identified by GC/MS (gas chromatography coupled with mass spectrometry). The impurities coming from the refrigerant F and those coming from the lubricant can thus be combined; the lubricant is analysed: colour (by spectrocolorimetry, Labomat DR Lange LICO220 Model MLG131), water content (by Karl Fischer coulometry, Mettler DL37) and acid number (by quantitative determination with 0.01N methanolic potassium hydroxide).

3 commercial lubricants were tested: the PAG ND8 oil, the POE Ze-GLES RB68 oil and the PVE FVC 68D oil.

| | PAG ND8 | | POE Ze-GLES RB68 | PVE FVC 68D |
|---|---|---|---|---|
| Refrigerant | HFO-1234yf | Trans-HFO-1234ze | Trans-HFO-1234ze | Trans-HFO-1234ze |
| By-products in the gas phase: | | | | |
| from the refrigerant | 0 1000 ppm | 4000 ppm + 6000 ppm (HFO-1234yf) | 500 ppm + 1500 ppm (HFO-1234yf) | 3% + 1800 ppm (HFO-1234yf) |
| from the lubricant | 3% | 2% | 800 ppm | 2% |
| Analysis of the lubricant: | | | | |
| colour | 9 Gardner | 17 Gardner | 300 Hazen | 6 Gardner |
| water content | 1500 ppm | 1100 ppm | 500 ppm | 500 ppm |
| acid number | 4.5 mg KOH/g | >10 mg KOH/g | 0.6 mg KOH/g | 1.1 mg KOH/g |

The procedure is carried out as previously, except that the refrigerant is replaced with the refrigerant F. It is noted that the addition of trans-HFO-1234ze to HFO-1234yf in the presence of POE or PVE improves the stability of the lubricant. In addition, in the presence of POE, the stability of the refrigerant is also improved.

APPLICATIONS

Thermodynamic performance of the systems using the refrigerant F
Calculation Tools The RK—Soave equation is used for the calculation of the densities, enthalpies, entropies and the liquid-vapour equilibrium data of the mixtures. The use of this equation requires knowledge of the properties of the pure substances used in the mixtures in question and also the coefficients of interaction for each binary combination.

The data necessary for each pure substance are: boiling point, critical pressure and temperature, curve of pressure as a function of temperature starting from the boiling point to the critical point, saturated liquid and saturated vapour densities as a function of temperature.

The HFO temperature-pressure curve data are measured by the static method. The critical pressure and temperature are measured using a C80 calorimeter sold by Setaram. The densities, at saturation as a function of temperature, are measured by means of the vibrating tube densimeter technology developed by the laboratories of the école des Mines de Paris [French Engineering School].

Coefficient of Binary Interaction:

The RK-Soave equation uses coefficients of binary interaction to represent the behaviour of products in mixtures. The coefficients are calculated according to experimental liquid-vapour equilibrium data. The technique used for the liquid-vapour equilibrium measurements is the static analytical cell method. The equilibrium cell comprises a sapphire tube and is equipped with two Rolsitm electromagnetic samplers. It is immersed in a cryothermostat bath (Huber HS40). Magnetic stirring driven by a magnetic field rotating at a variable speed is used to accelerate the reaching of the equilibria. The sample analysis is carried out by gas chromatography (HP5890 series II) using a katharometer (TCD).

Trans-HFO-1234ze/HFO-1234yf

The liquid-vapour equilibrium measurements on the HFO-1234ze/HFO-1234yf binary combination are carried out for the following isotherm: 18° C.

Compression System

Consider a compression system equipped with an evaporator, a condenser, a liquid-vapour exchanger (internal exchanger), a screw compressor and a pressure regulator.

The system operates with 15° C. of overheat and an internal exchanger between the outlets of the condenser and of the evaporator.

The isentropic efficiency of the compressors depends on the compression ratio. This efficiency is calculated according to the following equation:

$$\eta_{isen} = a - b(\tau - c)^2 - \frac{d}{\tau - e} \quad (1)$$

For a screw compressor, the constants a, b, c, d and e of the isentropic efficiency equation (1) are calculated according to the standard data published in the "Handbook of air conditioning and refrigeration, page 11.52".

The coefficient of performance (COP) is defined as being the useful power supplied by the system over the power provided or consumed by the system.

The Lorenz coefficient of performance (COPLorenz) is a reference coefficient of performance. It depends on temperatures and is used to compare the COPs of the various refrigerants.

The Lorenz coefficient of performance is defined as follows:
(the temperatures T are in K)

$$T_{average}^{condensor} = T_{inlet}^{condensor} - T_{outlet}^{condensor} \quad (2)$$

$$T_{average}^{evaporator} = T_{outlet}^{evaporator} - T_{inlet}^{evaporator} \quad (3)$$

The Lorenz COP in the case of conditioned air and refrigeration:

$$COPlorenz = \frac{T_{average}^{evaporator}}{T_{average}^{condensor} - T_{average}^{evaporator}} \quad (4)$$

The Lorenz COP in the Case of Heating:

$$COPlorenz = \frac{T_{average}^{condensor}}{T_{average}^{condensor} - T_{average}^{evaporator}} \quad (5)$$

For each composition, the coefficient of performance of the Lorenz cycle is calculated as a function of the corresponding temperatures. The % COP/COPLorenz is the ratio of the COP of the system relative to the COP of the corresponding Lorenz cycle.

Results in Cooling Mode

In cooling mode, the compression system operates between an evaporation temperature of −5° C. and a condensation temperature of 50° C.

The values of the constituents (HFO-1234yf, trans-HFO-1234ze) for each composition are given as percentage by weight.

| Cooling mode | | Temp evap inlet (° C.) | Temp comp outlet (° C.) | T condensation (° C.) | T pressure regulator | Evap P (bar) | Cond P (bar) | Ratio (w/w) | Glide | Comp efficiency | % CAP | % COP/ COPLorenz |
|---|---|---|---|---|---|---|---|---|---|---|---|---|
| HFO-1234yf | HFO-1234ze | −5 | 73 | 50 | 42 | 1.8 | 10.0 | 5.6 | 0.00 | 74.8 | 100 | 54 |
| 65 | 35 | −5 | 71 | 50 | 42 | 2.3 | 12.3 | 5.2 | 0.49 | 76.7 | 120 | 54 |
| 55 | 45 | −6 | 72 | 50 | 42 | 2.3 | 12.0 | 5.3 | 0.62 | 76.2 | 117 | 53 |
| 45 | 55 | −6 | 73 | 50 | 42 | 2.2 | 11.8 | 5.4 | 0.70 | 75.8 | 114 | 53 |
| 35 | 65 | −6 | 73 | 50 | 42 | 2.1 | 11.4 | 5.5 | 0.70 | 75.4 | 110 | 53 |
| 25 | 75 | −6 | 73 | 50 | 42 | 2.0 | 11.1 | 5.6 | 0.63 | 75.0 | 107 | 53 |
| 15 | 85 | −5 | 74 | 50 | 42 | 1.9 | 10.7 | 5.6 | 0.46 | 74.8 | 104 | 53 |
| 5 | 95 | −5 | 73 | 50 | 42 | 1.8 | 10.2 | 5.7 | 0.18 | 74.7 | 101 | 54 |

Results in Heating Mode

In heating mode, the compression system operates between an evaporation temperature of −5° C. and a condensation temperature of 50° C.

The values of the constituents (HFO-1234yf, trans-1-IFO-1234ze) for each composition are given as percentage by weight.

| Heating mode | | Temp evap inlet (° C.) | Temp comp outlet (° C.) | T condensation (° C.) | T pressure regulator | Evap P (bar) | Cond P (bar) | Ratio (w/w) | Glide | Comp efficiency | % CAP | % COP/ COPLorenz |
|---|---|---|---|---|---|---|---|---|---|---|---|---|
| HFO-1234yf | HFO-1234ze | −5 | 73 | 50 | 42 | 1.8 | 10.0 | 5.6 | 0.00 | 74.8 | 100 | 62 |
| 65 | 35 | −5 | 71 | 50 | 42 | 2.3 | 12.3 | 5.2 | 0.49 | 76.7 | 120 | 61 |
| 55 | 45 | −6 | 72 | 50 | 42 | 2.3 | 12.0 | 5.3 | 0.62 | 76.2 | 117 | 61 |
| 45 | 55 | −6 | 73 | 50 | 42 | 2.2 | 11.8 | 5.4 | 0.70 | 75.8 | 114 | 61 |
| 35 | 65 | −6 | 73 | 50 | 42 | 2.1 | 11.4 | 5.5 | 0.70 | 75.4 | 110 | 61 |
| 25 | 75 | −6 | 73 | 50 | 42 | 2.0 | 11.1 | 5.6 | 0.63 | 75.0 | 107 | 61 |
| 15 | 85 | −5 | 74 | 50 | 42 | 1.9 | 10.7 | 5.6 | 0.46 | 74.8 | 104 | 61 |
| 5 | 95 | −5 | 73 | 50 | 42 | 1.8 | 10.2 | 5.7 | 0.18 | 74.7 | 101 | 62 |

The invention claimed is:

1. Composition comprising (i) at least one lubricant consisting of at least one polyol ester obtained from a linear or branched carboxylic acid containing from 5 to 9 carbon atoms and (ii) a refrigerant consisting of from 15 to 35% by weight of 2,3,3,3-tetrafluoropropene (HFO-1234yf) and from 65 to 85% by weight of trans-1,3,3,3-tetra-fluoropropene (trans-HFO-1234ze), wherein the at least one polyol ester comprises pentaerythritol ester.

2. Composition according to claim 1, wherein the at least one polyol ester is between 10 and 50% by weight of the composition.

3. Composition according to claim 1, wherein said composition exhibits a Hazen color of about 200 or less as measured by ASHRAE test 97-2007 after a sealed glass tube comprising the composition is welded closed and placed in an oven at 200° C. for 14 days.

4. Composition according to claim 2, wherein said composition exhibits a Hazen color of about 200 or less as measured by ASHRAE test 97-2007 after a sealed glass tube comprising the composition is welded closed and placed in an oven at 200° C. for 14 days.

* * * * *